(12) United States Patent
Magrath et al.

(10) Patent No.: US 10,663,737 B1
(45) Date of Patent: May 26, 2020

(54) APPARATUS, SYSTEMS, AND METHODS FOR MAGNETICALLY DETACHABLE HEAD-MOUNTED-DISPLAY STRAP INTERFACES

(71) Applicant: FACEBOOK TECHNOLOGIES, LLC, Menlo Park, CA (US)

(72) Inventors: Lesley Ribble Magrath, Seattle, WA (US); Paul Bongkyu Koh, New York, NY (US)

(73) Assignee: Facebook Technologies, LLC, Menlo Park, CA (US)

( * ) Notice: Subject to any disclaimer, the term of this patent is extended or adjusted under 35 U.S.C. 154(b) by 70 days.

(21) Appl. No.: 15/589,988

(22) Filed: May 8, 2017

(51) Int. Cl.
| | |
|---|---|
| *G02B 27/01* | (2006.01) |
| *H01R 13/62* | (2006.01) |
| *G02C 5/00* | (2006.01) |
| *G02B 7/22* | (2006.01) |
| *G02B 7/00* | (2006.01) |

(52) U.S. Cl.
CPC ..... *G02B 27/0176* (2013.01); *G02B 27/0179* (2013.01); *H01R 13/6205* (2013.01); *G02B 7/002* (2013.01); *G02B 7/22* (2013.01); *G02B 27/017* (2013.01); *G02B 2027/0154* (2013.01); *G02C 5/00* (2013.01)

(58) Field of Classification Search
CPC .......... G02B 27/0176; G02B 27/0179; G02B 7/002; G02B 2027/0154; G02B 7/22; G02B 27/017; G02B 2027/0178; G02B 2027/014; G02B 27/014; H01R 13/6205; G02C 5/00

USPC .................................................. 359/13, 477
See application file for complete search history.

(56) References Cited

U.S. PATENT DOCUMENTS

| | | | |
|---|---|---|---|
| 2007/0254510 A1* | 11/2007 | DeBey | H01R 13/6205 439/188 |
| 2008/0279409 A1* | 11/2008 | Hupkes | H04R 1/1066 381/370 |
| 2017/0337897 A1* | 11/2017 | Jung | G06F 3/012 |

* cited by examiner

*Primary Examiner* — Jade R Chwasz
(74) *Attorney, Agent, or Firm* — FisherBroyles, LLP

(57) ABSTRACT

A magnetically detachable head-mounted-display strap-interface apparatus may include (1) a strap that includes an electrical accessory that necessitates an electrical connection to a head-mounted display and (2) a mount coupled to the strap that includes (a) an interface that is mateable and demateable to an opposing interface of the head-mounted display, (b) an electrical connector that is configured to provide the electrical connection from the electrical accessory to the head-mounted display when contacting an opposing electrical connector of the head-mounted display, and (c) a magnetic element that magnetically couples the interface and the opposing interface of the head-mounted display by attracting an opposing magnetic element of the head-mounted display and enables the interface to be decoupled from the opposing interface of the head-mounted display and the electrical connector to be disconnected from the opposing electrical connector. Various other detachable head-mounted-display strap-interface devices, systems, and methods are also disclosed.

20 Claims, 7 Drawing Sheets

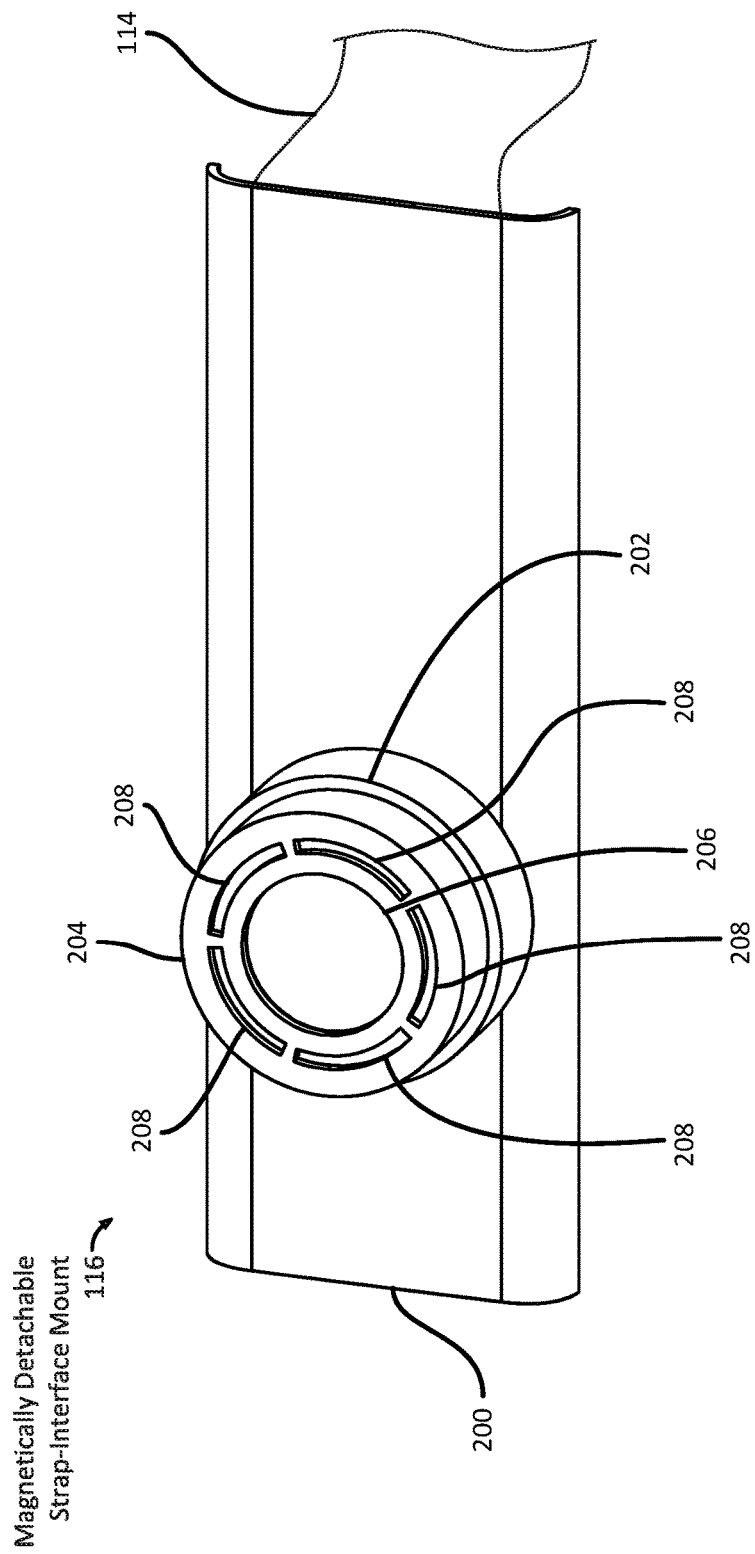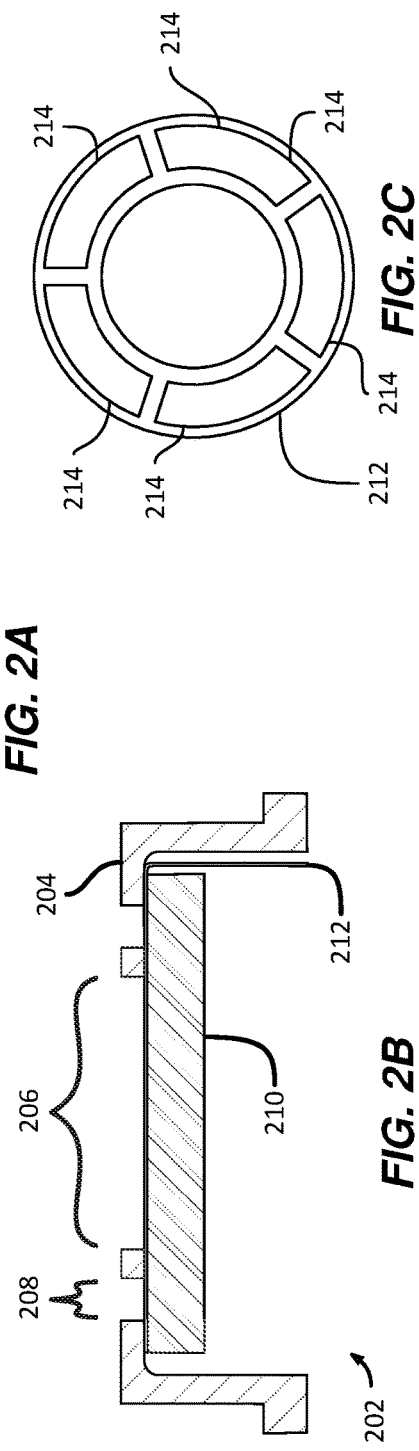

APPARATUS, SYSTEMS, AND METHODS FOR MAGNETICALLY DETACHABLE HEAD-MOUNTED-DISPLAY STRAP INTERFACES

BACKGROUND

Virtual-reality head-mounted displays have wide applications in various fields, including engineering, design, medical surgery practice, military simulated practice, and video gaming. For example, virtual-reality head-mounted displays may allow users to experience realistic, immersive virtual environments while playing video games, during flight-simulation training, or when interacting with co-workers around the globe.

A conventional head-mounted display may include a strap system that holds the head-mounted display on a user's head and against the user's face. Unfortunately, the straps or other components of a conventional strap system may become worn and dirty over time, which may necessitate removal and replacement of the straps. Additionally, conventional head-mounted displays are often shipped with generic one-size-fits-all strap systems that may not suit every user. For example, generic one-size-fits-all strap systems may not fit all users equally well and may not suit the stylistic tastes of many users, especially users that have a more individualized fashion sense. For at least these reasons, many users may want or need to remove and replace the generic one-size-fits-all strap systems that come with conventional head-mounted displays.

SUMMARY

As will be described in greater detail below, the instant disclosure generally relates to magnetically detachable head-mounted-display strap interfaces, devices, systems, and methods. In some embodiments, a magnetically detachable head-mounted-display strap-interface apparatus may include (1) a strap that includes an electrical accessory that may necessitate an electrical connection to a head-mounted display and (2) a mount coupled to the strap that includes (a) an interface that is mateable and demateable to an opposing interface of the head-mounted display, (b) an electrical connector that is configured to provide the electrical connection from the electrical accessory to the head-mounted display when contacting an opposing electrical connector of the head-mounted display, and (c) a magnetic element that magnetically couples the interface and the opposing interface of the head-mounted display and enables the interface to be decoupled from the opposing interface of the head-mounted display and the electrical connector to be disconnected from the opposing electrical connector. In some embodiments, the magnetic element may magnetically couple the interface and the opposing interface of the head-mounted display by attracting an opposing magnetic element of the head-mounted display such that (1) the electrical connector and the opposing electrical connector maintain contact and (2) the strap holds the head-mounted display against a user's face.

In some embodiments, the magnetic element may include a ferromagnetic element, and the opposing magnetic element may include a magnet that applies an attractive magnetic force to the ferromagnetic element. In alternative embodiments, the opposing magnetic element may include a ferromagnetic element, and the magnetic element may include a magnet that applies an attractive magnetic force to the ferromagnetic element.

In some embodiments, the interface may include a cylindrical plug, and the opposing interface may include a cylindrical port that is configured to receive the cylindrical plug. In at least one embodiment, the cylindrical plug may include a distal face, and the electrical connector may be integral to the distal face. In some embodiments, the opposing magnetic element may include a cylindrical magnet centered within the cylindrical port, and the cylindrical plug may include a distal face. In such embodiments, the distal face may include (1) a circular opening centered within the distal face and shaped to receive the circular magnet and (2) a circular slit coaxial with the circular opening and shaped to (a) receive the opposing electrical connector and (b) enable the mount to rotate while the electrical connector and the opposing electrical connector are in contact.

In some embodiments, the cylindrical plug may include a distal face that may include five circular slits that are evenly and concentrically arranged about the center of the distal face. In one example, one of the five circular slits may be shaped to receive the opposing electrical connector and enable the mount to rotate while the electrical connector and the opposing electrical connector are in contact.

In at least one embodiment, the mount may include four additional electrical connectors configured to provide additional electrical connections to the head-mounted display when contacting four additional opposing electrical connectors of the head-mounted display. In some embodiments, the opposing electrical connector may include a spring connector, and the electrical connector may include a contact pad configured to blind-mate to the spring connector. The electrical connector may be configured to carry electrical power, an audio signal, a video signal, a sensor signal, or a control signal. In some embodiments, the electrical accessory may include a light-emitting motion-tracking accessory, an audio accessory, or a cable.

According to various embodiments, a corresponding magnetic head-mounted-display strap-interface apparatus may include (1) a head-mounted display and (2) a mount coupled to the head-mounted display that includes (a) an interface that is mateable and demateable to an opposing interface of a strap that includes an electrical accessory that may necessitate an electrical connection to the head-mounted display, (b) an electrical connector that is configured to provide the electrical connection from the electrical accessory to the head-mounted display when contacting an opposing electrical connector of the strap, and (c) a magnetic element that magnetically couples the interface and the opposing interface of the strap. In some embodiments, the magnetic element may magnetically couple the interface and the opposing interface of the strap by attracting an opposing magnetic element of the strap such that (a) the electrical connector and the opposing electrical connector maintain contact and (b) the strap holds the head-mounted display against a user's face. The magnetic element may also enable the interface to be decoupled from the opposing interface of the strap and the electrical connector to be disconnected from the opposing electrical connector.

In some embodiments, the magnetic element may include a ferromagnetic element, and the opposing magnetic element may include a magnet that applies an attractive magnetic force to the ferromagnetic element. In alternative embodiments, the opposing magnetic element may include a ferromagnetic element, and the magnetic element may include a magnet that applies an attractive magnetic force to the ferromagnetic element.

In some embodiments, the opposing interface may include a cylindrical plug, and the interface may include a cylindrical port that is configured to receive the cylindrical plug. The cylindrical port may include a planar base, and the electrical connector may be integral to the planar base. In some embodiments, the magnetic element may include a cylindrical magnet centered within the cylindrical port, the mount may include four additional electrical connectors configured to provide additional electrical connections to the head-mounted display when contacting four additional opposing electrical connectors of the head-mounted display, and the electrical connector and the four additional electrical connectors may be evenly and concentrically arranged about the cylindrical magnet.

According to various embodiments, a corresponding head-mounted-display system may include (1) a head-mounted display and (2) a strap that includes an electrical accessory that may necessitate an electrical connection to the head-mounted display. The system may also include a first mount coupled to the head-mounted display that includes (1) a first interface that is mateable and demateable to a second interface of the strap, (2) a first electrical connector that is configured to provide the electrical connection from the electrical accessory to the head-mounted display when contacting a second electrical connector of the strap, and (3) a first magnetic element that magnetically couples the first interface and the second interface of the strap and enables the first interface to be decoupled from the second interface of the strap. The system may also include a second mount coupled to the strap that includes (1) the second interface that is mateable and demateable to the first interface of the head-mounted display, (2) the second electrical connector that is configured to provide the electrical connection from the electrical accessory to the head-mounted display when contacting the first electrical connector of the head-mounted display, and (3) the second magnetic element that magnetically couples the first interface and the second interface of the strap and enables the first interface to be decoupled from the second interface of the strap.

In some embodiments, the first magnetic element may include a ferromagnetic element, and the second magnetic element may include a magnet that applies an attractive magnetic force to the ferromagnetic element. In alternative embodiments, the second magnetic element may include a ferromagnetic element, and the first magnetic element may include a magnet that applies an attractive magnetic force to the ferromagnetic element.

In addition to the various systems and devices described herein, the instant disclosure presents exemplary methods associated with head-mounted-display strap systems. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate examples of apparatuses, systems, and methods according to various embodiments described herein. These drawings are a part of the specification and, together with the following description, demonstrate and explain various principles of the instant disclosure. Throughout the drawings, identical reference characters and descriptions indicate similar, but not necessarily identical, elements.

FIG. 2A is a perspective view of an exemplary magnetically detachable strap-interface mount with a magnetic interface.

FIG. 2B is a cross-sectional view of the magnetic interface illustrated in FIG. 2A.

FIG. 2C is a front view of the ribbon cable illustrated in FIG. 2B shown with electrical connectors.

Figure 1:
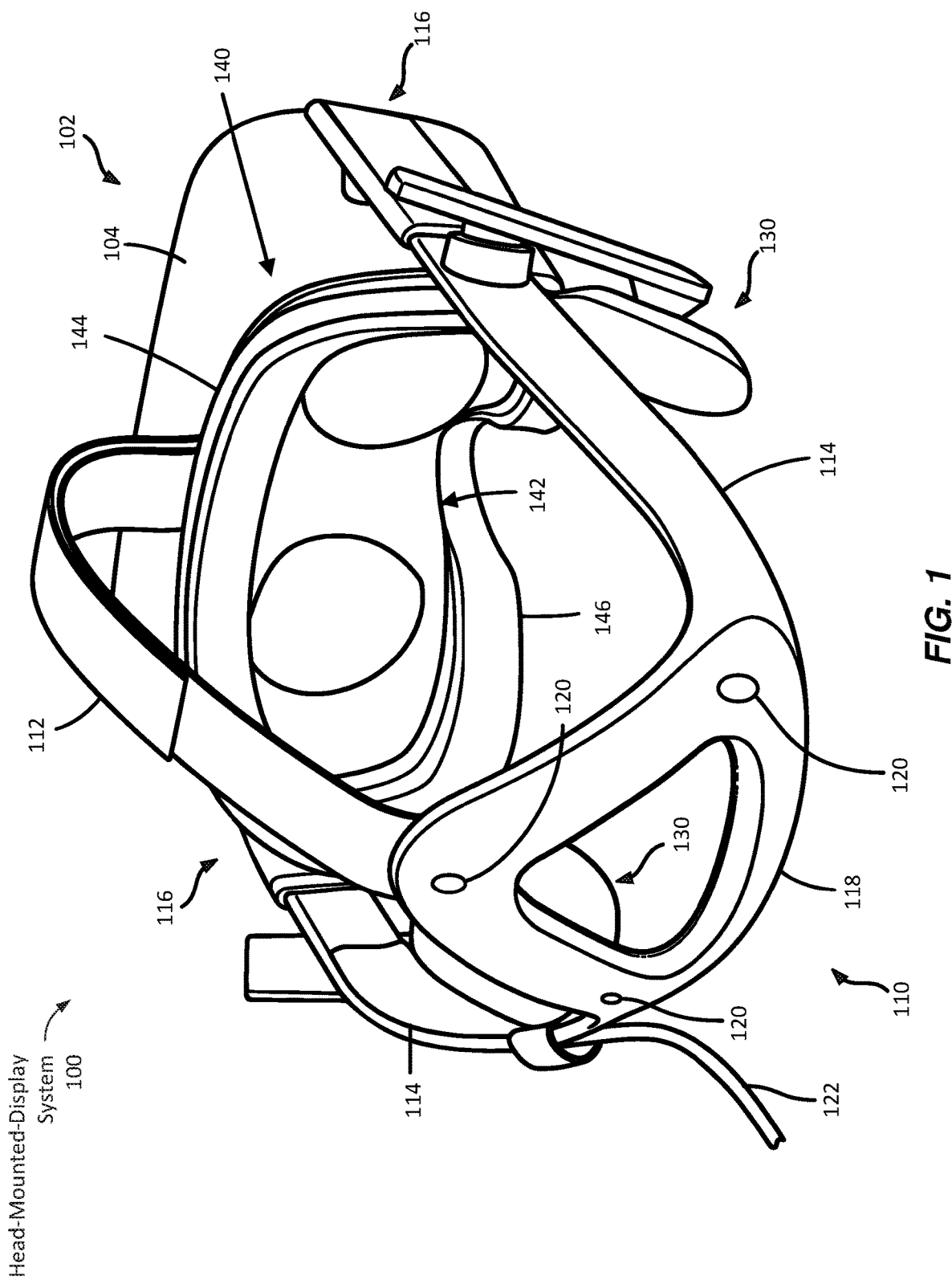
FIG. 1 is a perspective view of an exemplary head-mounted-display system with a magnetically detachable strap system in accordance with some embodiments.

While the exemplary embodiments described herein are susceptible to various modifications and alternative forms, specific embodiments have been shown by way of example in the drawings and will be described in detail herein. However, the elements, configurations, and steps shown in the drawings are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The disclosure provided herein describes and illustrates numerous exemplary magnetic strap-mount interfaces for detachably coupling a strap system that includes one or more electrical accessories (e.g., lights, power cables, video cables, headphones, etc.) to a head-mounted display to which the electrical accessories may need to be electrically connected. These magnetic strap-mount interfaces may incorporate electrical connectors that may provide electrical connections from the electronic accessories of the head-mounted-display strap system to the head-mounted display. The head-mounted-display systems disclosed herein with magnetically detachable strap systems may provide various features and advantages over conventional head-mounted-display systems by enabling a strap system, especially a strap system with integrated electrical accessories, to be easily attached to and removed from a head-mounted display. In this way, users of the head-mounted-display systems disclosed herein may replace dirty or worn straps systems and/or swap out generic strap systems with strap systems that better suit their needs.

Figure 4A:
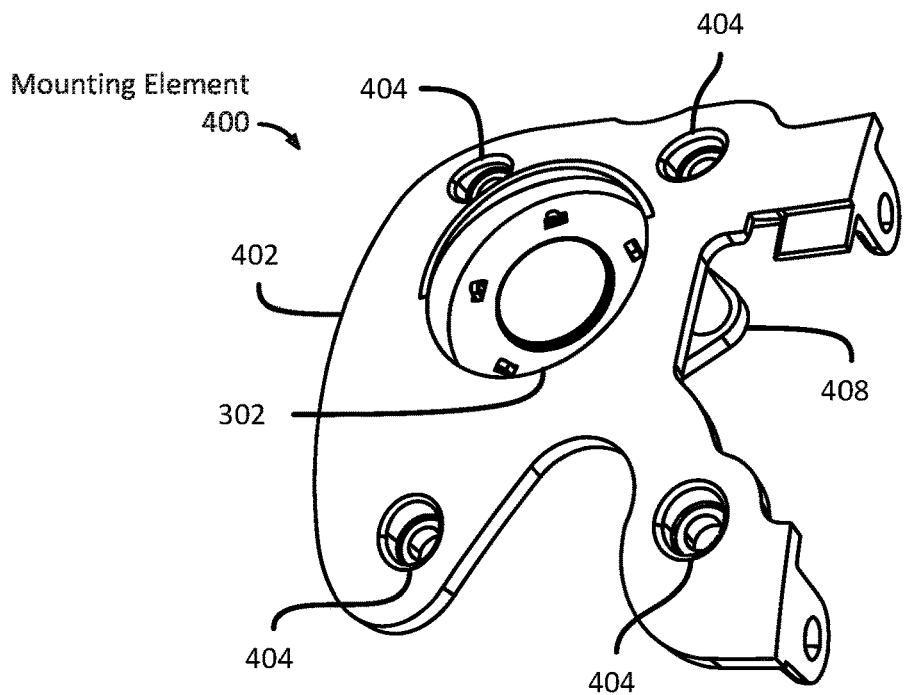
FIG. 4A is a perspective view of an exemplary mounting element with a magnetic interface.
Figure 4B:
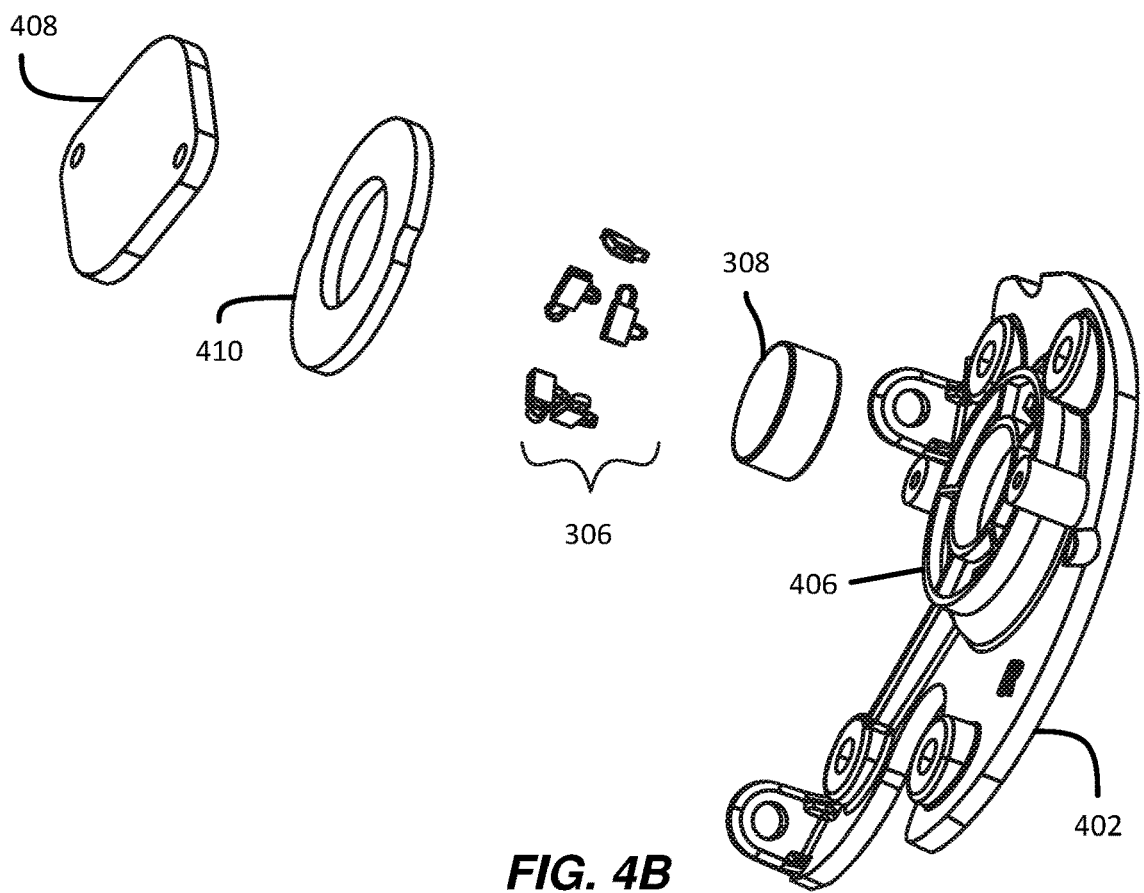
FIG. 4B is an exploded view of the mounting element illustrated in FIG. 4A.
Figure 5:
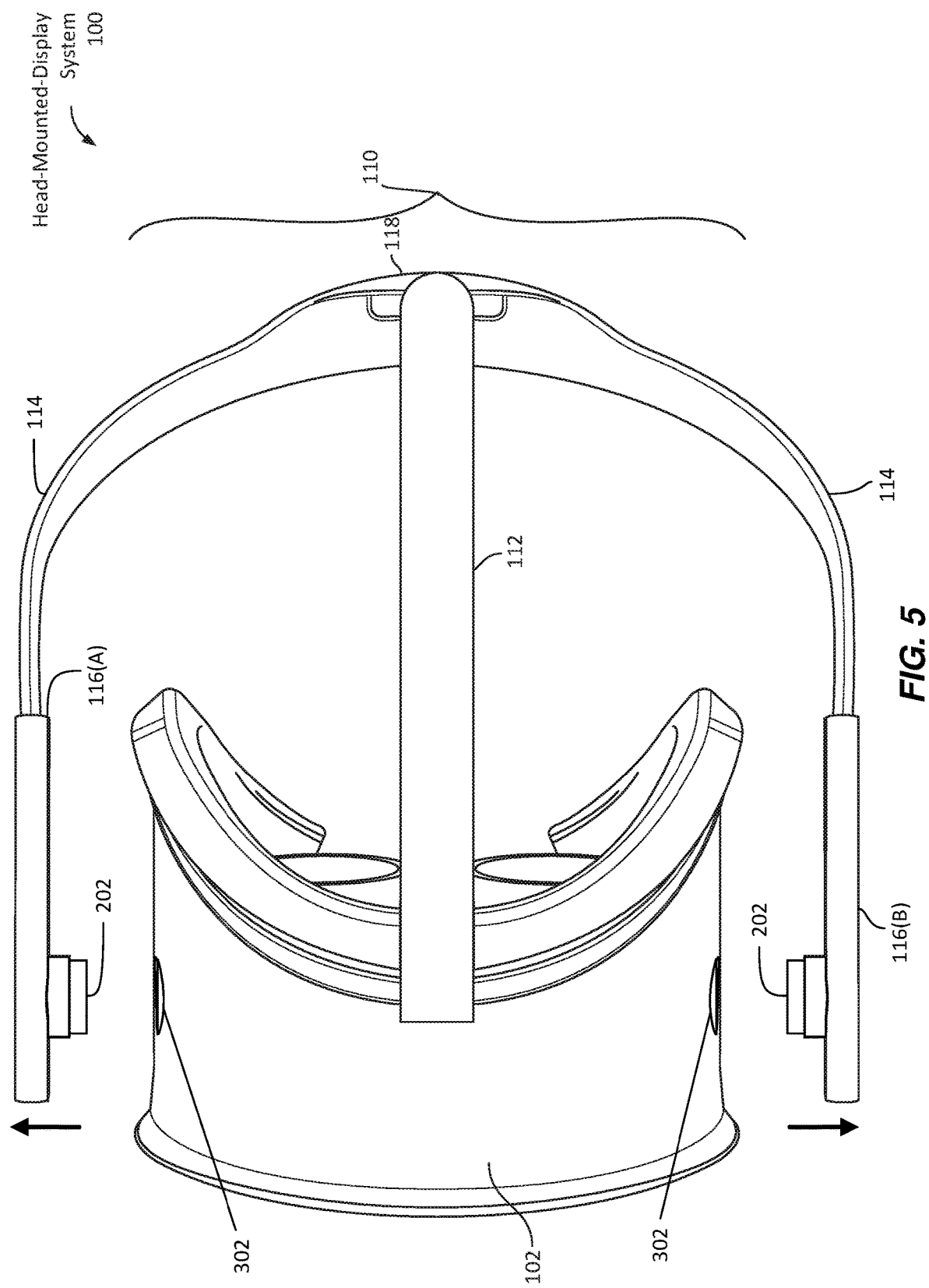
FIG. 5 is a top view of an exemplary head-mounted-display system with a detached strap system.
Figure 6:
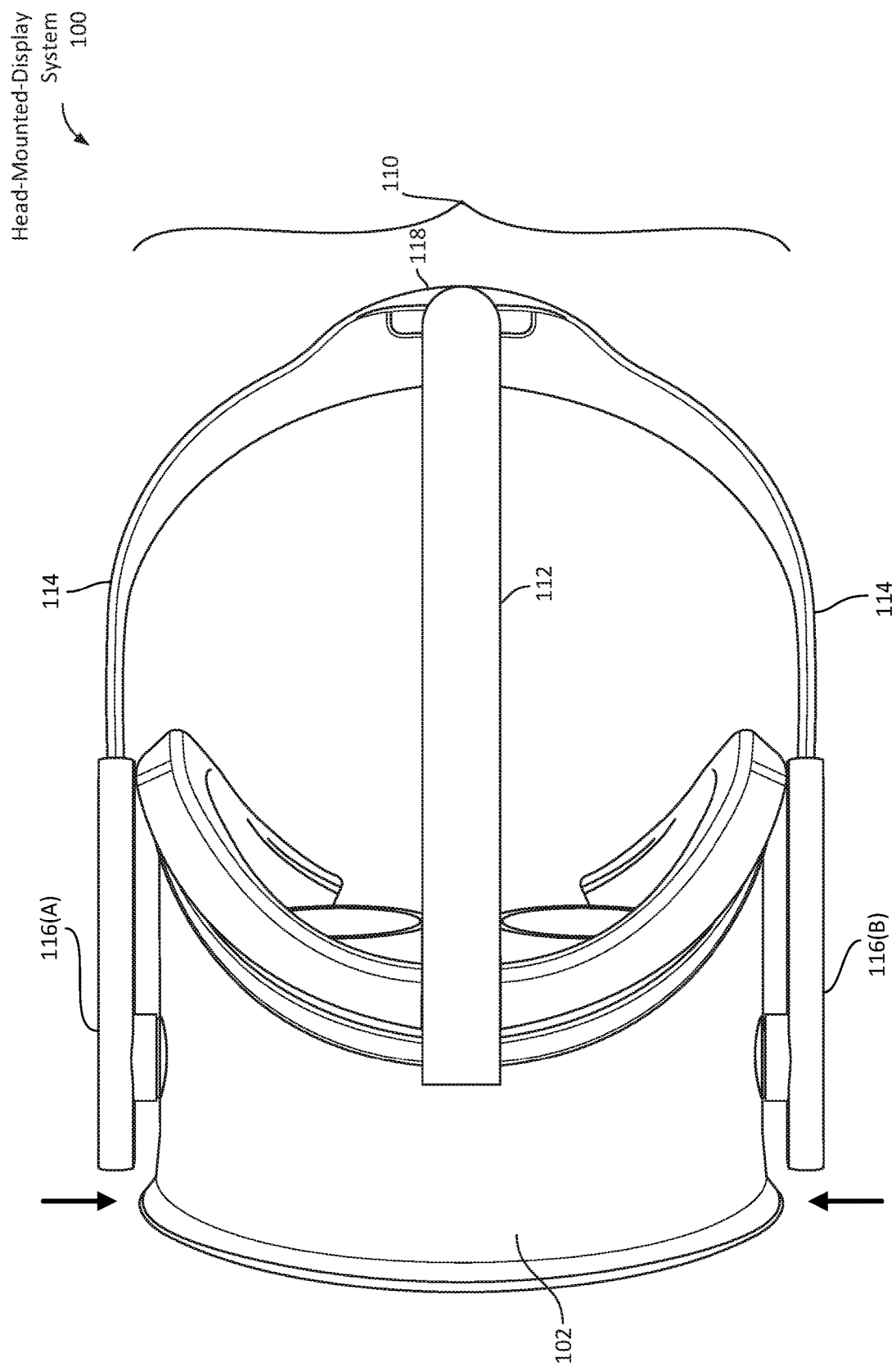
FIG. 6 is a top view of the head-mounted-display system illustrated in FIG. 5 with the strap system illustrated in FIG. 5 attached.

The following will provide, with reference to FIGS. 1, 5, and 6, examples of head-mounted-display systems with magnetically detachable strap systems. In addition, the discussions associated with FIGS. 2A-4B will provide examples of magnetic head-mounted-display strap-interface apparatus that enable the magnetic detachability of the strap systems illustrated in FIGS. 1, 5, and 6. Finally, the discussion corresponding to FIG. 7 will provide examples of methods for manufacturing, assembling, configuring, and/or using the head-mounted-display systems presented herein.

FIG. 1 is a perspective view of an exemplary head-mounted-display system 100 with a magnetically detachable strap system 110 in accordance with some embodiments. Head-mounted-display system 100 includes a head-mounted display 102 coupled to detachable strap system 110. The term "head-mounted display," as used herein, generally refers to any type or form of display device or system that is worn on or about a user's head and displays visual content to a user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Examples of head-mounted displays may include OCULUS RIFT, GOOGLE GLASS, VIVE, SAMSUNG GEAR, etc.

In some embodiments, head-mounted display 102 may include an outer housing 104 that may surround, contain, and protect various display, optical, and other electronic components of head-mounted display 102. As will be explained in greater detail below, outer housing 104 may include integrated interfaces (e.g., interface 302 in FIG. 3) for attaching detachable strap system 110. Head-mounted display 102 may also include a facial-interface subsystem 140. Facial-interface subsystem 140 may be configured to comfortably rest against a region of a user's face, including a region surrounding the user's eyes, when head-mounted-display system 100 is worn by the user. In these embodiments, facial-interface subsystem 140 may include a facial-interface cushion 146 that is coupled to a facial-interface mounting member 144. Facial-interface cushion 146 and facial-interface mounting member 144 may surround a viewing region 142 that includes the user's field of vision while the user is wearing head-mounted-display system 100.

In some embodiments, detachable strap system 110 may be used to mount head-mounted display 102 on a user's head. As shown in FIG. 1, detachable strap system 110 may include an upper strap 112 and lower straps 114. Lower straps 114 may each be coupled to one of magnetically detachable strap-interface mounts 116, which are shown magnetically coupled to head-mounted display 102. Detachable strap system 110 may adjustably conform to the top and/or sides of a user's head when the user is wearing head-mounted-display system 102. In some embodiments, detachable strap system 110 may include a back piece 118 coupled with upper strap 112 and lower straps 114 to rest against the back of the user's head (e.g., around the user's occipital lobe).

Detachable strap system 110 may include various electrical accessories that may require an electrical connection to head-mounted display 102. As used herein, the term "electrical accessory" generally refers to any electrical component that may need or require, for proper operation, a connection to electrical power and/or a physical electrical pathway to the electrical components of a head-mounted display. Examples of electrical accessories may include, without limitation, sensors, output devices (e.g., lights, display devices, audio devices, haptic devices, etc.), wireless communication devices (e.g., antennae), and electrical signal or power transfer mediums (e.g., wires or cables). As shown in FIG. 1, detachable strap system 110 may include motion-tracking lights 120 integrated into back piece 118, a cable 122 integrated into one of lower straps 114, and audio subsystems 130 coupled to lower straps 114. While not illustrated in FIG. 1, each of motion-tracking lights 120, cable 122, and audio subsystems 130 may be connected, via a physical electrical pathway (e.g., a wire or cable), to electrical connectors (e.g., electrical contact pads 214 illustrated in FIG. 2C) contained in one or both of magnetically detachable strap-interface mounts 116.

In some embodiments, motion-tracking lights 120 may be light-emitting-diode markers that are used by an external motion-tracking system to track the position and/or motion of head-mounted-display system 100. In some embodiments, cable 122 may carry power to head-mounted display 102 and/or various electrical signals (e.g., video signals, audio signals, control signals, and/or sensor signals) from or to an external computing system. In some embodiments, audio subsystems 130 may provide audio signals to a user's ears. As shown, head-mounted-display system 100 may have two audio subsystems 130 located on the left and right sides of head-mounted-display system 100 to provide audio signals to the user's left and right ears.

FIG. 2A is a perspective view of an inner mounting surface 200 of a magnetically detachable strap-interface mount 116 in accordance with some embodiments. In some examples, inner mounting surface 200 may include a magnetic interface 202 that is shaped to mateably and demateably engage an opposing strap interface of head-mounted display 102 (e.g., magnetic interface 302 illustrated in FIG. 3). In general, magnetic interface 202 may be configured as one half of a pair of mating physical interfaces that detachably couple magnetically detachable strap-interface mount 116 to head-mounted display 102. In some embodiments, as shown in FIG. 2A, magnetic interface 202 may be configured as a cylindrical male plug with a distal face 204. While FIG. 2A illustrates magnetic interface 202 as a cylindrical male plug, magnetic interface 202 may be configured in any other suitable shape (e.g., squared or angular). Magnetic interface 202 may also be configured as either a protruding (i.e., male) interface that may be inserted into a matching recessed (i.e., female) interface or a recessed interface that may accept a matching protruding interface.

Distal face 204 may include one or more electrical connectors (e.g., electrical connectors 214 in FIG. 2C). Distal face 204 may also include various holes and slits that may enable corresponding elements (e.g., electrical connectors and/or magnetic elements) of an opposing interface to pass through distal face 204 to various elements coupled to the backside of distal face 204. For example, distal face 204 may include (1) a circular opening 206 that is centered within distal face 204 and shaped to receive a circular magnetic element (e.g., a circular magnet) of head-mounted display 102 and (2) circular slits 208 that are coaxial with circular opening 206 and shaped to allow electrical connectors of head-mounted display 102 to pass through and contact electrical connectors that are positioned behind distal face 204 (as shown in FIG. 2B). As shown in FIG. 2A, circular slits 208 may be evenly and concentrically arranged about the center of distal face 204. In some examples, circular slits 208 may be configured with a length (e.g., 10 millimeters) that enables magnetically detachable strap-interface mount 116 to rotate a small degree while the electrical connectors contained in magnetic interface 202 and opposing electrical connectors of a head-mounted display are in contact.

FIG. 2B is a cross-sectional view of magnetic interface 202 illustrated in FIG. 2A according to some embodiments. As shown, magnetic interface 202 may include an electrical-connection element 212 and a magnetic element 210 that are both coupled to the backside of distal face 204. Magnetic element 210 may be configured to attract an opposing magnetic element of head-mounted display 102 (e.g., magnetic element 308 in FIG. 3) and constructed from any suitable ferromagnetic or magnetic material. In some examples, magnetic element 210 may be a permanent magnet. Electrical-connection element 212 may be configured as a ribbon cable with integrated electrical connectors. As shown in FIG. 2C, electrical-connection element 212 may include electrical contact pads 214. Electrical contact pads 214 may be flat contact pads or surfaces that are evenly and concentrically arranged about the center of electrical-connection element 212. In some examples, electrical contact pads 214 may be configured to carry electrical power, an audio signal, a video signal, a sensor signal, or a control signal to one or more electrical accessories. In some examples, electrical contact pads 214 may be configured to blind-mate to opposing spring connectors of a head-mounted display.

Magnetic interface 202 may include various magnetic elements that may magnetically couple magnetic interface 202 to an opposing interface of head-mounted display 102 by either applying an attractive magnetic force to an opposing magnetic element of the opposing interface or being attracted to an opposing magnetic element of the opposing interface. For example, magnetic interface 202 may include magnetic element 210 illustrated in FIG. 2B. Additionally or alternatively, some or all of magnetic interface 202 may be constructed from a ferromagnetic or magnetic material.

Figure 3A:
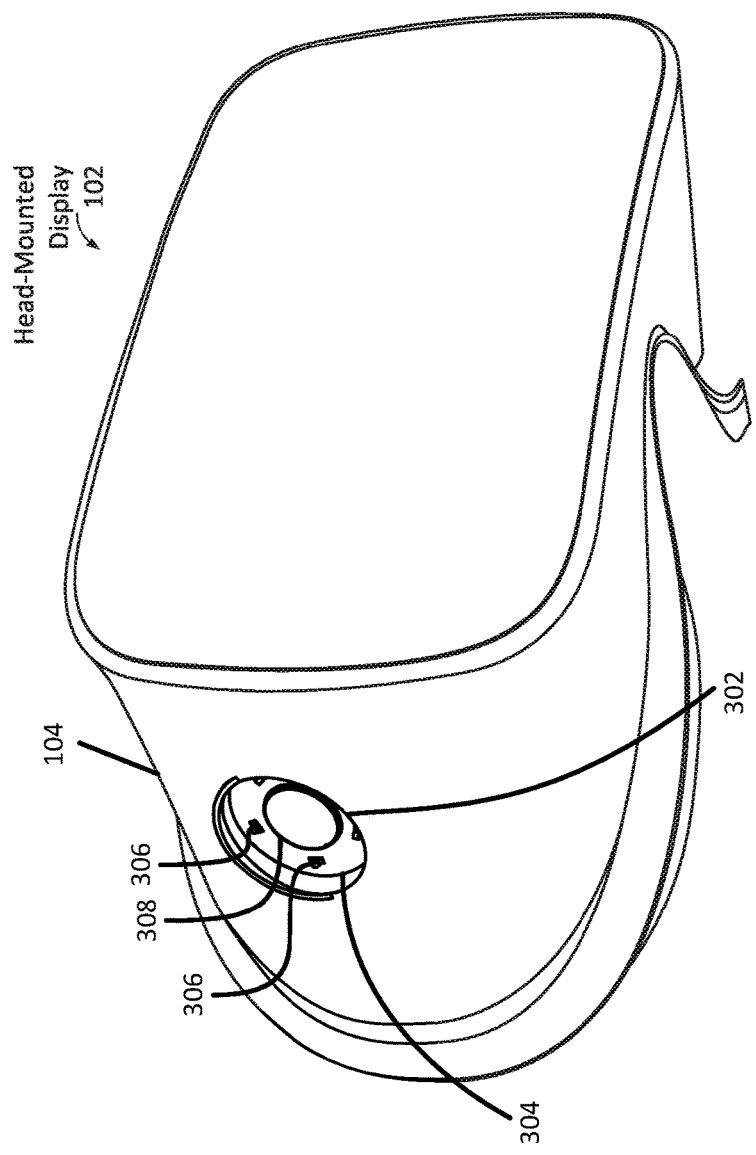
FIG. 3A is a perspective view of an exemplary head-mounted display with a magnetic interface.

FIG. 3A is a perspective view of head-mounted display 102 in accordance with some embodiments. As shown, head-mounted display 102 includes outer housing 104 with an integrated magnetic interface 302 for interfacing with an opposing interface of a detachable-strap system. Magnetic interface 302 may be shaped to mateably and demateably engage an opposing strap interface of detachable strap system 110 (e.g., magnetic interface 202 illustrated in FIG. 2A). In general, magnetic interface 302 may be configured as one half of a pair of mating physical interfaces that detachably couple head-mounted display 102 to detachable strap system 110. In some examples, as shown in FIG. 3A, magnetic interface 302 may be configured as a cylindrical female port that is recessed into outer housing 104. While FIG. 3A illustrates magnetic interface 302 as a cylindrical female port, magnetic interface 302 may be configured in any other suitable shape (e.g., squared or angular). Additionally, magnetic interface 302 may be configured as a protruding (i.e., male) interface that may be inserted into a matching recessed (i.e., female) interface or a recessed interface that may accept a matching protruding interface.

Magnetic interface 302 may include a base surface 304 that includes electrical connectors 306 and a magnetic element 308. In general, electrical connectors 306 may be any electrical connector that may be blind-mated with opposing electrical connectors of a detachable strap system. In some examples, electrical connectors 306 may be spring-loaded connectors, spring-loaded pins, spring probes, or pogo pins that may make an electrical connection when contacting another conductive surface. Electrical connectors 306 may provide, when in contact with opposing electrical connectors of a detachable strap system, an electrical connection from electronic accessories of the detachable strap system to electrical components contained in outer housing 104.

Figure 3B:
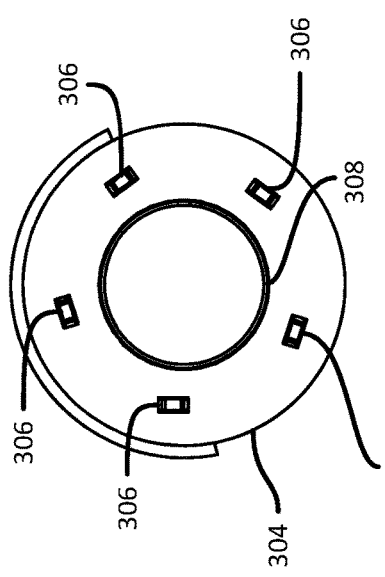
FIG. 3B is a front view of the magnetic interface illustrated in FIG. 3A.

Magnetic element 308 may be configured to attract an opposing magnetic element of detachable strap system 110 (e.g., magnetic element 210 in FIG. 2B) and constructed from any suitable ferromagnetic or magnetic material. In some examples, magnetic element 308 may be a cylindrical permanent magnet. As shown in FIG. 3B, magnetic element 308 may be positioned in the center of base surface 304, and electrical connectors 306 may be evenly and concentrically arranged about the center of base surface 304. Magnetic element 308 may provide, when in close proximity to an opposing magnetic element of a detachable strap system, an attractive force that detachably couples the detachable strap system to head-mounted display 102.

In some examples, outer housing 104 and magnetic interface 302 may be configured as a single seamless element. Alternatively, magnetic interface 302 may be incorporated into a mounting element that may be coupled to outer housing 104. FIG. 4A shows a perspective view of an exemplary mounting element 400 that may be coupled to outer housing 104 in accordance with some embodiments. As illustrated, mounting element 400 may include an outer surface 402 in which magnetic interface 302 is integrally formed and holes 404 that enable mounting element 400 to be affixed to outer housing 104 with suitable fasteners (e.g., suitable screws).

FIG. 4B shows an exploded view of mounting element 400. As illustrated, mounting element 400 may include an inner surface 406 against which a retention plate 408 may couple magnetic element 308 and an electrical-connection element 410 to mounting element 400 when retention plate 408 is secured to mounting element 400 with suitable fasteners. In this example, electrical connectors 306 may be coupled to electrical-connection element 410, and magnetic element 308 may be coupled to retention plate 408. As shown, mounting element 400 may include various holes and slits that may enable corresponding elements (e.g., electrical connectors 306 and/or magnetic element 308) to be mounted against inner surface 406 and pass through mounting element 400.

FIGS. 5-6 are simplified top views of head-mounted-display system 100. In these figures, detachable strap system 110 includes two instances of magnetically detachable strap-interface mounts 116 which are referenced here as 116(A) and 116(B). As shown in FIG. 5, magnetically detachable strap-interface mount 116(A) may be coupled to a right-side lower strap 114 of detachable strap system 110. Similarly, magnetically detachable strap-interface mount 116(B) may be coupled to a left-side lower strap 114 of detachable strap system 110. FIG. 5 illustrates head-mounted-display system 100 when each of magnetically detachable strap-interface mounts 116(A) and 116(B) are detached from head-mounted display 102. In this example, magnetically detachable strap-interface mounts 116(A) and 116(B) may have each been previously attached to head-mounted display 102 (as shown in FIG. 6), and a user may have detached magnetically detachable strap-interface mounts 116(A) and 116(B) from head-mounted display 102 by pulling magnetically detachable strap-interface mounts 116(A) and 116(B) in the directions indicated by arrows. FIG. 6 illustrates head-mounted-display system 100 when each of magnetically detachable strap-interface mounts 116(A) and 116(B) have been attached or reattached to head-mounted display 102. In this example, a user may have attached magnetically detachable strap-interface mounts 116(A) and 116(B) to head-mounted display 102 by inserting the magnetic interfaces of magnetically detachable strap-interface mounts 116(A) and 116(B) into magnetic interfaces 302 of head-mounted display 102.

Figure 7:
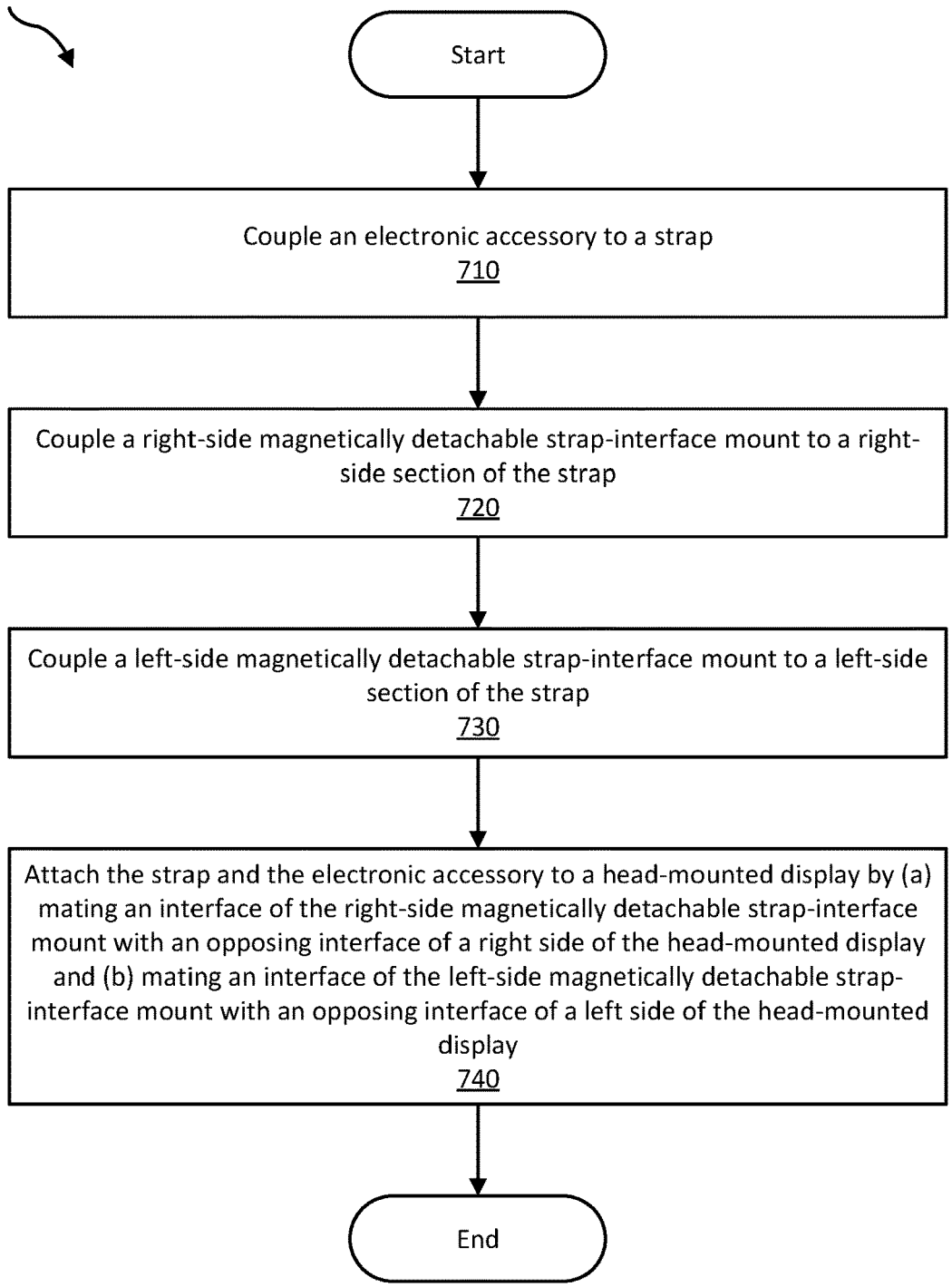
FIG. 7 is a flow diagram of an exemplary method for assembling a head-mounted-display system with a magnetically detachable strap system.

FIG. 7 shows, by way of example, a method for manufacturing, assembling, using, adjusting, or otherwise configuring or creating the systems and devices presented herein. In particular, FIG. 7 illustrates a flow diagram of a method 700 for assembling a magnetically detachable strap system and attaching the magnetically detachable strap system to a head-mounted display. As shown in FIG. 7, at step 710 an electronic accessory may be coupled to a strap. For example, lights 120 may be affixed to back piece 118, cable 122 may be integrated into left lower strap 114, and/or audio subsystems 130 may be attached or affixed to lower straps 114.

At step 720, a right-side magnetically detachable strap-interface mount may be coupled to a right-side section of the strap. For example, magnetically detachable strap-interface mount 116(A) may be coupled to right-side lower strap 114. At step 730, a left-side magnetically detachable strap-interface mount may be coupled to a left-side section of the strap. For example, magnetically detachable strap-interface mount 116(B) may be coupled to left-side lower strap 114.

At step 740, the strap and the electronic accessory may be attached to a head-mounted display by (a) mating an interface of the right-side magnetically detachable strap-interface mount with an opposing interface of a right-side of the head-mounted display and (b) mating an interface of the left-side magnetically detachable strap-interface mount with an opposing interface of a left-side of the head-mounted display. For example, strap system 110 may be attached to head-mounted display 102 by (a) mating magnetic interface 202 of magnetically detachable strap-interface mount 116(A) with magnetic interface 302 of the right side of head-mounted display 102 and by mating magnetic interface 202 of magnetically detachable strap-interface mount 116(B) with magnetic interface 302 of the left side of head-mounted display 102.

The process parameters and sequence of the steps described and/or illustrated in FIG. 7 are given by way of example only and can be varied as desired. For example, while the steps illustrated and/or described herein may be shown or discussed in a particular order, these steps do not necessarily need to be performed in the order illustrated or discussed to assemble, manufacture, or use a head-mounted-display system with a magnetically detachable strap system. The various exemplary methods described and/or illustrated in FIG. 7 may also omit one or more of the steps described or illustrated herein or include additional steps in addition to those disclosed.

As discussed throughout the instant disclosure, the disclosed methods, systems, and devices may provide one or more advantages over traditional head-mounted-display systems with traditional strap systems. For example, the magnetically detachable strap systems described herein may enable electronic accessories that need a physical electronic connection to a head-mounted display to be incorporated into a strap system that can easily be attached to and removed from the head-mounted display. In this way, users of the disclosed head-mounted-display systems with magnetically detachable strap systems may replace dirty or worn straps systems and/or swap out generic strap systems with strap systems that better suit their needs.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, thereby enabling others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The terminology used in the description of the various embodiments described herein is for the purpose of explaining particular embodiments only and is not intended to be limiting. As used in the discussion of the various highlighted embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A magnetically detachable head-mounted-display strap-interface apparatus comprising:
 a strap comprising an electrical accessory that necessitates an electrical connection to a head-mounted display;
 a mount coupled to the strap, the mount comprising:
  an electrical connector that is configured to provide the electrical connection from the electrical accessory to the head-mounted display when contacting an opposing electrical connector of the head-mounted display;
  an interface that is mateable and demateable to an opposing interface of the head-mounted display and shaped to enable the mount to rotate while the electrical connector and the opposing electrical connector are in contact; and a magnetic element that:
  magnetically couples the interface and the opposing interface of the head-mounted display by attracting an opposing magnetic element of the head-mounted display such that:
    the electrical connector and the opposing electrical connector maintain contact; and
    a first force applied by the strap holds the head-mounted display against a user's face; and
  enables, when a second force substantially perpendicular to the first force is applied to the mount, the interface to be decoupled from the opposing interface of the head-mounted display and the electrical connector to be disconnected from the opposing electrical connector.

2. The magnetically detachable head-mounted-display strap-interface apparatus of claim 1, wherein:
  the magnetic element comprises a ferromagnetic element; and
  the opposing magnetic element comprises a magnet that applies an attractive magnetic force to the ferromagnetic element.

3. The magnetically detachable head-mounted-display strap-interface apparatus of claim 1, wherein:
  the opposing magnetic element comprises a ferromagnetic element; and
  the magnetic element comprises a magnet that applies an attractive magnetic force to the ferromagnetic element.

4. The magnetically detachable head-mounted-display strap-interface apparatus of claim 1, wherein:
  the interface comprises a cylindrical plug; and
  the opposing interface comprises a cylindrical port that is configured to receive the cylindrical plug.

5. The magnetically detachable head-mounted-display strap-interface apparatus of claim 4, wherein:
  the cylindrical plug comprises a distal face; and
  the electrical connector is integral to the distal face.

6. The magnetically detachable head-mounted-display strap-interface apparatus of claim 4, wherein:
  the opposing magnetic element comprises a cylindrical magnet centered within the cylindrical port;
  the cylindrical plug comprises a distal face; and
  the distal face comprises:
    a circular opening centered within the distal face and shaped to receive the cylindrical magnet; and
    a circular slit coaxial with the circular opening and shaped to:
      receive the opposing electrical connector; and
      enable the mount to rotate to multiple positions relative to the head-mounted display while the electrical connector and the opposing electrical connector are in contact.

7. The magnetically detachable head-mounted-display strap-interface apparatus of claim 4, wherein:
  the cylindrical plug comprises a distal face;
  the distal face comprises five circular slits that are evenly and concentrically arranged about the center of the distal face; and
  one of the five circular slits is shaped to:
    receive the opposing electrical connector; and
    enable the mount to rotate to multiple positions relative to the head-mounted display while the electrical connector and the opposing electrical connector are in contact.

8. The magnetically detachable head-mounted-display strap-interface apparatus of claim 1, wherein the mount comprises four additional electrical connectors configured to provide additional electrical connections to the head-mounted display when contacting four additional opposing electrical connectors of the head-mounted display.

9. The magnetically detachable head-mounted-display strap-interface apparatus of claim 1, wherein:
  the opposing electrical connector comprises a spring connector; and
  the electrical connector comprises a contact pad configured to blind-mate to the spring connector.

10. The magnetically detachable head-mounted-display strap-interface apparatus of claim 1, wherein the electrical connector is configured to carry at least one of:
  electrical power;
  an audio signal;
  a video signal;
  a sensor signal; or
  a control signal.

11. The magnetically detachable head-mounted-display strap-interface apparatus of claim 1, wherein the electrical accessory comprises at least one of:
  a light-emitting motion-tracking accessory;
  an audio accessory; or
  a cable.

12. A magnetic head-mounted-display strap-interface apparatus comprising:
  a head-mounted display;
  a mount coupled to the head-mounted display, the mount comprising:
    an interface that is mateable and demateable to an opposing interface of a strap, the strap comprising an electrical accessory that necessitates an electrical connection to the head-mounted display;
    an electrical connector that is configured to provide the electrical connection from the electrical accessory to the head-mounted display when contacting an opposing electrical connector of the strap, the interface being further shaped to enable the mount to rotate while the electrical connector and the opposing electrical connector are in contact; and
    a magnetic element that:
      magnetically couples the interface and the opposing interface of the strap by attracting an opposing magnetic element of the strap such that:
        the electrical connector and the opposing electrical connector maintain contact; and
        a first force applied by the strap holds the head-mounted display against a user's face; and
      enables, when a second force substantially perpendicular to the first force is applied to the strap, the interface to be decoupled from the opposing interface of the strap and the electrical connector to be disconnected from the opposing electrical connector.

13. The magnetic head-mounted-display strap-interface apparatus of claim 12, wherein:
  the magnetic element comprises a ferromagnetic element; and
  the opposing magnetic element comprises a magnet that applies an attractive magnetic force to the ferromagnetic element.

14. The magnetic head-mounted-display strap-interface apparatus of claim 12, wherein:
  the opposing magnetic element comprises a ferromagnetic element; and
  the magnetic element comprises a magnet that applies an attractive magnetic force to the ferromagnetic element.

15. The magnetic head-mounted-display strap-interface apparatus of claim 12, wherein:
the opposing interface comprises a cylindrical plug; and
the interface comprises a cylindrical port that is configured to receive the cylindrical plug.

16. The magnetic head-mounted-display strap-interface apparatus of claim 15, wherein:
the cylindrical port comprises a planar base; and
the electrical connector is integral to the planar base.

17. The magnetic head-mounted-display strap-interface apparatus of claim 15, wherein:
the magnetic element comprises a cylindrical magnet centered within the cylindrical port;
the mount comprises four additional electrical connectors configured to provide additional electrical connections to the head-mounted display when contacting four additional opposing electrical connectors of the strap; and
the electrical connector and the four additional electrical connectors are evenly and concentrically arranged about the cylindrical magnet.

18. A head-mounted-display system comprising:
a head-mounted display;
a strap comprising an electrical accessory that necessitates an electrical connection to the head-mounted display;
a first mount coupled to the head-mounted display, the first mount comprising:
a first electrical connector that is configured to provide the electrical connection from the electrical accessory to the head-mounted display when contacting a second electrical connector of the strap;
a first interface that is mateable and demateable to a second interface of the strap and shaped to enable the first mount to rotate while the first electrical connector and the second electrical connector are in contact; and
a first magnetic element that:
magnetically couples the first interface and the second interface of the strap by attracting a second magnetic element of the strap such that:
the first electrical connector and the second electrical connector maintain contact; and
a first force applied by the strap holds the head-mounted display against a user's face; and
enables, when a second force substantially perpendicular to the first force is applied to the first mount, the first interface to be decoupled from the second interface of the strap and the first electrical connector to be disconnected from the second electrical connector;
a second mount coupled to the strap, the second mount comprising:
the second interface that is mateable and demateable to the first interface of the head-mounted display and shaped to enable the second mount to rotate while the first electrical connector and the second electrical connector are in contact;
the second electrical connector that is configured to provide the electrical connection from the electrical accessory to the head-mounted display when contacting the first electrical connector of the head-mounted display; and
the second magnetic element that:
magnetically couples the first interface and the second interface of the strap by attracting the first magnetic element such that:
the first electrical connector and the second electrical connector maintain contact; and
a third force applied by the strap holds the head-mounted display against a user's face; and
enables, when a fourth force substantially perpendicular to the third force is applied to the second mount, the first interface to be decoupled from the second interface of the strap and the first electrical connector to be disconnected from the second electrical connector.

19. The head-mounted-display system of claim 18, wherein:
the first magnetic element comprises a ferromagnetic element; and
the second magnetic element comprises a magnet that applies an attractive magnetic force to the ferromagnetic element.

20. The head-mounted-display system of claim 18, wherein:
the second magnetic element comprises a ferromagnetic element; and
the first magnetic element comprises a magnet that applies an attractive magnetic force to the ferromagnetic element.

* * * * *